United States Patent
Geipel et al.

(10) Patent No.: US 12,361,280 B2
(45) Date of Patent: Jul. 15, 2025

(54) METHOD AND DEVICE FOR TRAINING A MACHINE LEARNING ROUTINE FOR CONTROLLING A TECHNICAL SYSTEM

(71) Applicant: Siemens Healthcare Diagnostics Inc., Tarrytown, NY (US)

(72) Inventors: Markus Michael Geipel, Munich (DE); Stefan Depeweg, Munich (DE); Christoph Tietz, Ottobrunn (DE); Gaby Marquardt, Hausen (DE); Daniela Seidel, Baiersdorf (DE)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 1201 days.

(21) Appl. No.: 17/265,476

(22) PCT Filed: Jul. 29, 2019

(86) PCT No.: PCT/IB2019/056435
§ 371 (c)(1),
(2) Date: Feb. 2, 2021

(87) PCT Pub. No.: WO2020/026107
PCT Pub. Date: Feb. 6, 2020

(65) Prior Publication Data
US 2021/0201151 A1    Jul. 1, 2021

(30) Foreign Application Priority Data
Aug. 3, 2018    (EP) .................................... 18187335

(51) Int. Cl.
*G06N 3/08*    (2023.01)
*G06F 18/2415*    (2023.01)
(Continued)

(52) U.S. Cl.
CPC .......... *G06N 3/08* (2013.01); *G06F 18/24155* (2023.01); *G06F 18/256* (2023.01);
(Continued)

(58) Field of Classification Search
CPC ........ G06N 3/08; G06N 3/044; G06N 3/0455; G06N 3/0464; G06N 5/01; G06N 3/047;
(Continued)

(56) References Cited

U.S. PATENT DOCUMENTS

| | | | |
|---|---|---|---|
| 2010/0272351 A1* | 10/2010 | Kato | G06V 10/955 |
| | | | 382/159 |
| 2015/0052093 A1 | 2/2015 | Canoy et al. | |

(Continued)

FOREIGN PATENT DOCUMENTS

| JP | 2010257140 A | 11/2013 |
|---|---|---|
| JP | 2018520404 A | 7/2018 |

OTHER PUBLICATIONS

Srivastava, Nitish, et al. "Dropout: a simple way to prevent neural networks from overfitting." The journal of machine learning research 15.1 (2014): 1929-1958. (Year: 2014).*

(Continued)

*Primary Examiner* — Michelle T Bechtold
*Assistant Examiner* — Nicholas S Wu
(74) *Attorney, Agent, or Firm* — Dugan & Dugan, PC

(57) ABSTRACT

To train a machine learning routine (BNN), a sequence of first training data (PIC) is read in through the machine learning routine. The machine learning routine is trained using the first training data, wherein a plurality of learning parameters (LP) of the machine learning routine is set by the training. Furthermore, a value distribution (VLP) of the learning parameters, which occurs during the training, is determined and a continuation signal (CN) is generated on the basis of the determined value distribution of the learning
(Continued)

parameters. Depending on the continuation signal, the training is then continued with a further sequence of the first training data or other training data (PIC2) are requested for the training.

20 Claims, 2 Drawing Sheets

(51) Int. Cl.
*G06F 18/25* (2023.01)
*G06N 3/044* (2023.01)
*G06N 3/0455* (2023.01)
*G06N 3/0464* (2023.01)
*G06N 3/047* (2023.01)
*G06N 3/09* (2023.01)
*G06N 5/01* (2023.01)
*G06N 20/20* (2019.01)

(52) U.S. Cl.
CPC ........... *G06N 3/044* (2023.01); *G06N 3/0455* (2023.01); *G06N 3/0464* (2023.01); *G06N 3/047* (2023.01); *G06N 3/09* (2023.01); *G06N 5/01* (2023.01); *G06N 20/20* (2019.01)

(58) Field of Classification Search
CPC .... G06N 3/09; G06N 20/20; G06F 18/24155; G06F 18/256
See application file for complete search history.

(56) References Cited

U.S. PATENT DOCUMENTS

| | | |
|---|---|---|
| 2015/0324688 A1 | 11/2015 | Wierzynski et al. |
| 2018/0181865 A1 | 6/2018 | Adachi |
| 2019/0065884 A1* | 2/2019 | Li ......................... G06V 10/764 |
| 2019/0220697 A1* | 7/2019 | Kiemele ................... G06T 7/75 |
| 2019/0332938 A1* | 10/2019 | Gendron-Bellemare ..................... G06N 3/09 |

OTHER PUBLICATIONS

Gal, Yarin, Riashat Islam, and Zoubin Ghahramani. "Deep bayesian active learning with image data." International conference on machine learning. PMLR, 2017. (Year: 2017).*
Krawczyk, Bartosz, et al. "Dynamic ensemble selection for multiclass classification with one-class classifiers." Pattern Recognition 83 (2018): 34-51. (Year: 2018).*
Gama, Joao, et al. "Learning with drift detection." Advances in Artificial Intelligence—SBIA 2004: 17th Brazilian Symposium on Artificial Intelligence, Sao Luis, Maranhao, Brazil, Sep. 29-Oct. 1, 2004. Proceedings 17. Springer Berlin Heidelberg, 2004. (Year: 2004).*
Mullachery, Vikram, Aniruddh Khera, and Amir Husain. "Bayesian neural networks." arXiv preprint arXiv:1801.07710 (2018). (Year: 2018).*
Holub, Alex, Pietro Perona, and Michael C. Burl. "Entropy-based active learning for object recognition." 2008 IEEE Computer Society Conference on Computer Vision and Pattern Recognition Workshops, IEEE, 2008. (Year: 2008).*
Dredze, Mark, Koby Crammer, and Fernando Pereira. "Confidence-weighted linear classification." Proceedings of the 25th international conference on Machine learning. 2008. (Year: 2008).*
Miranda, Eka & Irwansyah, E., "A Survey of Medical Image Classification Techniques", 2016 International Conference on Information Management and Technology (ICIMTech), p. 56-61 (2016).
European Extended Search Report of related European Application No. 18187335.7 dated Feb. 5, 2019.
International Search Report and Written Opinion of related International Application No. PCT/IB2019/056435 dated Oct. 17, 2019.

* cited by examiner

METHOD AND DEVICE FOR TRAINING A MACHINE LEARNING ROUTINE FOR CONTROLLING A TECHNICAL SYSTEM

CROSS REFERENCE TO RELATED APPLICATIONS

This is a 371 of PCT/IB2019/056435, filed Jul. 29, 2019, which claims priority to European Patent Application No. EP 18187335.7, filed Aug. 3, 2018, both of which are hereby incorporated by reference herein in their entireties for all purposes.

FIELD

The invention is directed to machine learning routines for controlling a technical system.

BACKGROUND

In the control of complex technical systems, such as medical diagnostic equipment, image analysis systems, robots, autonomous systems, wind turbines, gas turbines, or production facilities, machine learning techniques are being increasingly used to optimize the capabilities of the technical system with regard to specified criteria. In particular, an evaluation of sensor data of the technical system can be controlled by a trained machine learning routine.

A wide range of known learning methods is available for training machine learning routines, such as supervised learning methods. In particular, historical or current operating data or sensor data of the technical system to be controlled or similar technical systems can be used as training data.

For example, in a medical diagnostic device, a machine learning routine can be trained to recognize and classify cell or tissue types on microscopic images, or specifically, tumors on tomography images. For such a training procedure, a large number of pre-classified medical images are often used, which are fed to the machine learning routine as training data. The machine learning routine can thus be trained to reproduce the specified classification as well as possible, or to recognize the cell types, tissue types, or tumors with as little deviation as possible from the specified classification. Similarly, a machine learning routine for a gas turbine, a manufacturing facility, or other technical system can be trained to recognize and/or classify specific operating states based on sensor data or other operating data, and/or to provide optimized control of the technical system.

In practice, however, it is often the case that some of the classes to be recognized appear much less frequently than other recognition classes. Consequently, for very rare recognition classes, there is usually considerably less training data available than for other recognition classes.

However, especially in the medical field it is often important to recognize rare pathological patterns or changes correctly. In such cases, it may take a very long time before sufficient training data from rare classes are evaluated in order to also recognize these classes with sufficient reliability.

Regardless of this, some recognition classes may be more difficult to distinguish from one another on the basis of the given training data than other recognition classes. In such cases, it is often the case that a recognition reliability can no longer be significantly improved even if the training procedure is continued.

According to the existing prior art, the above circumstances are often handled by gradually increasing the amount of training data and observing a success rate of the machine learning routine. As soon as the success rate fails to improve significantly, particularly for rare recognition classes, the training can be stopped. If a success rate remains permanently low, this can also be taken as an indication that the sensor data used for the training is not well suited for reliable recognition. In such a case, the training is often continued or repeated with different sensor data.

Using the above procedure, a required training effort can increase considerably, in particular when rare identification classes are present.

SUMMARY OF THE INVENTION

The object of the present invention is to specify a method and a device for training a machine learning routine for controlling a technical system that allows for more efficient training.

This object is achieved by a method having the features of patent claim 1, by a device having the features of patent claim 13, and by a computer-readable storage medium having the features of patent claim 15.

In order to train a machine learning routine for controlling a technical system, a sequence of first training data, comprising first sensor data of a technical system, is read in by the machine learning routine. The technical system in this case can be, in particular, a medical diagnostic device, an image analysis system, a robot, an autonomous system, a wind turbine, a gas turbine, or a production facility. The first training data are used to train the machine learning routine, wherein a plurality of learning parameters of the machine learning routine are set by means of the training. In addition, a value distribution of learning parameters occurring during the training is determined and a continuation signal is generated as a function of the determined value distribution of the learning parameters. Depending on the continuation signal, the training is then continued with a further sequence of the first training data, or else other training data are requested for the training.

It turns out that a value distribution of learning parameters occurring in the training, and in particular their distribution width, is often an early indicator of whether or not a training outcome can be improved by supplying additional first training data. In the latter case, qualitatively different training data can be requested at an early stage and used for further training. In this way, it is often possible to avoid supplying further first training data which would no longer significantly improve the training outcome.

The invention can be used to control the training and in particular the supply of suitable additional training data in an advantageous way, so that the training is often considerably improved or shortened.

For the implementation of the method according to the invention, a corresponding device, a computer program product, and a machine-readable storage medium are provided. By means of the method according to the invention, the device according to the invention or the computer program product according to the invention, for example, a machine learning routine of an assistant system, an analysis device, an evaluation device, or a control device can be trained. The trained machine learning routine can then be used to evaluate, analyze, classify, or predict sensor data or other operating data of the technical system. Depending on this, the technical system can be controlled in an optimized way.

The method according to the invention, the device according to the invention, and the computer program product according to the invention can be embodied or implemented, for example, by means of one or more processors, application specific integrated circuits (ASIC), digital signal processors (DSP), and/or so-called "Field Programmable Gate Arrays" (FPGA).

Advantageous embodiments and extensions of the invention are specified in the dependent claims.

According to advantageous embodiments of the invention, the other training data may be of a different type from the first training data, be acquired in a different way from the first training data, comprise different sensor data than the first sensor data, and/or originate from a different source than the first training data. In particular, the other training data may include higher-resolution or more refined sensor data, or measurement data of other physical or chemical quantities.

In addition, as a function of the continuation signal, a sensor or a sensor system can be controlled in such a way that a sensor parameter of a sensor for acquiring training data is modified, that a sensor of the sensor system is induced to acquire training data, and/or that specific sensor data of the sensor system is selected as training data.

According to an advantageous embodiment of the invention, a distribution width and/or an entropy value of the value distribution of the learning parameters can be determined. With increasing distribution width and/or increasing entropy value, the training can then preferably be continued with the further sequence of the first training data. This is advantageous in the sense that a larger distribution width or a larger entropy value of the value distribution of the learning parameters can in many cases be considered as an indication that an optimal setting of the learning parameters has not yet been found. In such cases, it can often be expected that a training outcome can be further improved by additional training with the first training data. A respective distribution width can be determined in particular from value distributions of individual learning parameters, from value distributions of groups of learning parameters, or from a value distribution of all learning parameters.

According to another advantageous embodiment of the invention, a value distribution of output data of the learning routine can be determined and the continuation signal can be formed as a function of the value distribution of the output data.

In particular, a distribution width and/or an entropy value of the value distribution of the output data can be determined. With increasing distribution width and/or increasing entropy value, the other training data can then preferably be requested. This is advantageous in the sense that a larger distribution width or a larger entropy value of the value distribution of the output data can in many cases be considered as an indication that the trained learning routine can only provide uncertain results. In such cases, a training outcome can often be improved by switching to qualitatively different training data.

As the respective distribution width, in particular a scatter, variance or standard deviation of the value distribution of the learning parameters or the value distribution of the output data can be determined.

Advantageously, a given value distribution can be represented, mapped, or modeled by a given distribution width and/or an average value, preferably a statistical Gaussian distribution or a categorical distribution over recognition classes. In this way, the value distributions can be saved in a compact manner and processed efficiently.

According to an advantageous extension of the invention, the training data records of the first training data can each be assigned to a specific recognition class. Preferably, the assignment to a recognition class can be realized by means of a class specification stored in the respective training record. Such a class specification can, for example, assign a microscopic image of a biological cell to a specific cell type as a recognition class. For a particular recognition class, a class-specific value distribution of learning parameters can be determined on the basis of the first training data records assigned to this recognition class, a class-specific continuation signal can be generated as a function of the class-specific value distribution of the learning parameters, and depending on the class-specific continuation signal, the training can be continued with first training data assigned to this recognition class, or other training data assigned to this recognition class can be requested. In this way, the supply of training-supporting training data can be controlled in a class-specific manner. In particular, it can be determined individually for a particular recognition class whether a training procedure with further first training data or a switch to other training data is likely to be more advantageous. Accordingly, the training data to be used further for a particular recognition class can be selected on a class-specific basis.

According to a particularly advantageous embodiment of the invention, the value distribution of the learning parameters can be determined by the machine learning routine using a Bayesian neural network, wherein the learning parameters are realized by neural weights of the Bayesian neural network. The value distribution can be determined, for example, by means of Markov-chain Monte Carlo methods, Laplace approximations and/or inference methods, in particular by means of parameter fitting. Such Bayesian neural networks are particularly suitable for modeling statistical distributions, in particular of learning parameters.

According to a further embodiment of the invention, an ensemble of machine sub-learning routines can be executed by the machine learning routine, by means of which a set of learning parameters is set. The value distribution of the learning parameters can then be derived from a distribution of the learning parameters over the learning parameter sets.

According to a further embodiment of the invention, the machine learning routine can implement a neural network, the learning parameters being neural weights of the neural network. Here, a neural structure of the neural network can be varied multiple times, wherein a set of output data of the neural network is determined for a particular variation. The value distribution of the learning parameters can then be derived from a distribution of the output data over the output data sets. To vary the neural structure, neurons in the neural network can be switched off in different ways, preferably in a random way. Such deactivations are often referred to as drop-outs. The different drop-outs each induce a variation of the output data. From the distribution of the modified output data as well as from the pattern of the drop-outs, a value distribution of the learning parameters can be inferred.

BRIEF DESCRIPTION OF THE DRAWINGS

An exemplary embodiment of the invention is explained in more detail below with reference to the drawings. In the drawings, represented schematically in each case.

DETAILED DESCRIPTION OF THE INVENTION

Figure 1:
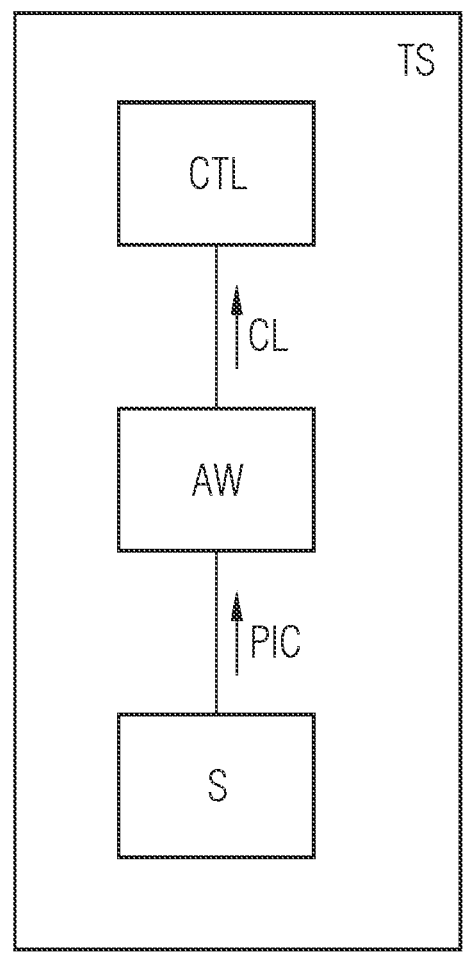
FIG. 1 shows a medical diagnostic device with a trained evaluation device.

FIG. 1 shows a schematic example of a medical diagnostic device as technical system TS with at least one sensor S and an evaluation device AW, trained by means of a machine learning method. The evaluation device is used for the evaluation of sensor data of the sensor S. The evaluation device AW can be implemented either as part of the diagnostic device TS or completely or partially externally to the diagnostic device TS. The evaluation device AW is connected to the sensor S and to a control unit CTL of the diagnostic device TS. The processor- or computer-controlled control device CTL is used to control the diagnostic device TS.

In this exemplary embodiment, an exemplary diagnostic device TS is considered which is designed to automatically recognize a type or a condition of a biological tissue or biological cells and/or a particular pathological class based on microscopic images PIC of the biological tissue or cells. Depending on the recognition, further measures can then be initiated by the diagnostic device TS or its control unit CTL, e.g., a specific treatment or examination of the imaged biological tissue or the biological cells, issuing of diagnostic or therapeutic instructions or automatic treatment measures, such as an administration and/or dosage of a drug.

Accordingly, the sensor S in the present exemplary embodiment is preferably designed as a microscope which records microscopic images PIC of the biological tissue or of the biological cells and transmits them to the evaluation device AW. Alternatively or in addition, another imaging sensor, e.g., a camera or an imaging procedure, e.g., a tomographic or ultrasonic procedure, can also be provided to create two- and/or three-dimensional images.

The trained evaluation device AW classifies the tissues or cells shown on the images PIC according to predefined recognition classes CL, i.e., for example, according to their type, condition, or pathological class. A class CL of a tissue or cell recognized on an image PIC is transmitted to the control unit CTL by the evaluation unit AW in the form of a class identifier. From the transmitted recognition classes CL, the control unit CTL controls the further behavior of the diagnostic unit TS—as already mentioned above.

Alternatively or additionally, as the technical system TS, a robot, an autonomous system, a wind turbine, a gas turbine or a production facility can be controlled by means of a specifically trained evaluation device AW. The evaluation device AW in this case can be trained to recognize and/or classify specific operating states of the technical system TS based on sensor data or other operating data of the technical system TS and/or to control the technical system TS in an optimized way using the control device CTL.

Controlling a technical system is also assumed to mean the output and use of control-relevant data and control signals, i.e., such signals as contribute to the control of the technical system. Such control-related data may comprise, in particular, classification data, analysis data, forecast data, and/or monitoring data, which can be used in particular for monitoring the technical system and/or for detecting wear and/or damage.

Figure 2:
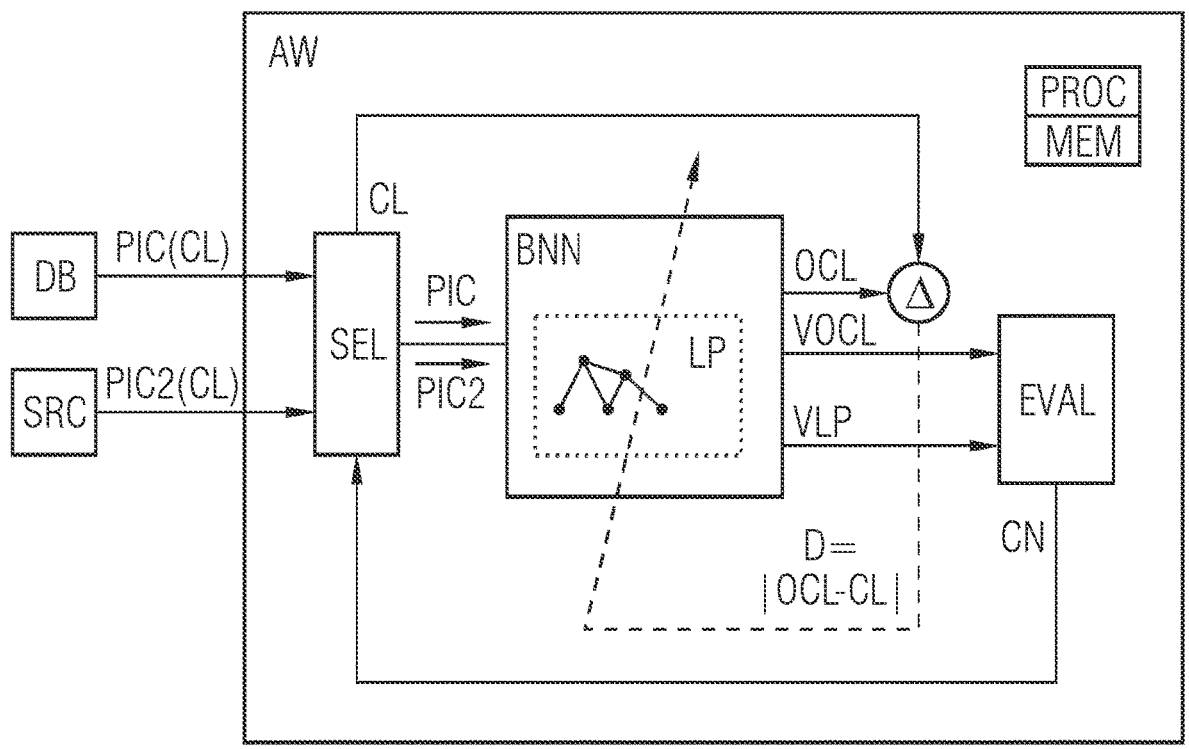
FIG. 2 shows a device according to the invention for training an evaluation device.

FIG. 2 shows a schematic representation of a device TA according to the invention for training the evaluation device AW. The evaluation unit AW has access to one or more computers or processors PROC for executing all process steps of the evaluation device AW, and also one or more memories MEM coupled with the processor PROC for storing the data to be processed by the evaluation device AW.

The evaluation device AW is trained using a plurality of classified training data sets, which in the present exemplary embodiment are read in from a database DB connected to the evaluation unit AW, among other things.

From the database DB, microscopic images PIC, each of which is assigned a recognition class CL, are read in as classified first training data PIC(CL). A particular recognition class CL specifies, for example, a type, a condition, and/or a pathological class of cells or tissues shown on the respective recorded image PIC. The assignment to a particular recognition class CL can be carried out in advance, e.g., by experts. Each recognition class CL is preferably stored in the form of a class identifier identifying the respective recognition class CL in addition to the image data PIC in the respective classified image PIC(CL). For example, the recorded images PIC can originate as first sensor data from a microscope as an imaging sensor.

In addition, the evaluation device AW can also be coupled to another source SRC of classified training data PIC2(CL). The training data PIC2(CL) available there contains different sensor data PIC2 than the first training data PIC(CL). In the other classified training data PIC2(CL), the other sensor data are also each assigned to a recognition class CL.

The other sensor data PIC2 can differ from the first sensor data PIC, in particular with respect to its type, quality, method of acquisition, and/or with respect to the acquiring sensor and/or its sensor settings. In particular, the other sensor data PIC2 can contain medical images taken at higher image resolution, with different magnification, with a different microscope, with a different camera, and/or in a different spectral range. In addition, the other sensor data PIC2 can also comprise and quantify other physical or chemical quantities. In general, the other sensor data PIC2 should preferably relate to or contain different recognition features or other recognition aspects of the recognition class CL than the first sensor data PIC.

The other training data PIC2(CL) can be requested by the evaluation device AW from the training data source SRC, in particular in a recognition class-specific way. The training data source SRC can comprise an additional database, additional sensors, and/or a sensor network.

For the training of the evaluation device AW, the classified recorded images PIC(CL) are first read in as a sequence of first training data by a selection module SEL of the evaluation device AW. The SEL selection module transfers the images PIC to a data-driven machine learning routine of the evaluation device AW.

The machine learning routine in this exemplary embodiment is implemented by a Bayesian neural network BNN connected to the selection module SEL. The Bayesian neural network BNN is designed as a convolutional neural network. Such a convolutional neural network is known to be advantageously applicable to image processing and image pattern recognition. The neural network BNN or the machine learning routine implemented thereby can be trained in a data-driven manner and has a training structure that is formed during a training run. The neural network BNN and/or its training structure is parameterized by learning parameters LP, which are set by the training run.

A training run is understood generally to mean an optimization of a mapping of input parameters of a parameterized system model, e.g., of a neural network, to one or more output parameters, in this case the classes CL to be recognized. This mapping is optimized according to predefined criteria that are learned and/or to be learned during a training phase. In classification models in particular, a classification error, an analysis error and/or a prediction error can be used as criteria. In addition, other criteria relating to the control of the technical system TS may be provided. A training structure can comprise, for example, a networked structure of neurons of a neural network and/or weights of connections between the neurons, which are formed by the training in such a way that the predefined criteria are satisfied as fully as possible.

The learning parameters LP are the model parameters of the system model to be optimized by the training, this model forming the basis of the machine learning routine. In this exemplary embodiment, the learning parameters LP are realized by the weights of the neural connections of the neural network BNN.

The aim of the training is to ensure that the neural network BNN classifies the supplied images PIC with the correct recognition class CL as frequently as possible. For this purpose, the learning parameters LP are set by the training in such a way that a recognition class OCL output by the neural network BNN for a supplied recorded image PIC reproduces the predefined recognition class CL of this recorded image PIC as accurately as possible. This can be achieved, for example, by comparing the recognition classes OCL output by an output layer of the neural network BNN as output data with the predefined recognition classes CL that are provided by the selection device SEL. As part of this comparison, a distance D is formed between the output data OCL and the corresponding, predefined recognition classes CL. The distance D represents a classification error of the neural network BNN. As indicated in FIG. 2 by a dashed arrow, the distance D is fed back to the neural network BNN. On the basis of the distance D fed back, the neural network BNN is trained to minimize this distance D, i.e., to reproduce the predefined recognition classes CL as well as possible by the output recognition classes OCL. For this purpose, the learning parameters LP can be varied using standard optimization methods until the distance D is minimized. For example, a gradient descent method can be used for the minimization.

The neural network BNN also determines a value distribution VLP of the learning parameters LP that occurs during training. In determining the value distribution VLP, it is advantageously assumed that the learning parameters LP are distributed according to a possibly multidimensional statistical Gaussian distribution and that the distributions of individual learning parameters are independent of one another. The value distribution VLP is then represented by a distribution width, in this case a variance or standard deviation of this Gaussian distribution. Such value distributions of network-internal learning parameters LP can be efficiently modeled and determined using a Bayesian neural network, here BNN, using standard methods. As an alternative or in addition to the distribution width of the value distribution VLP, an entropy value of the value distribution VLP can be determined.

It turns out that a smaller distribution width of the learning parameters LP can be taken to be an indication that the learning parameters LP are already set relatively accurately, i.e., that the neural network BNN is already largely optimized on the basis of the first training data PIC(CL). In this case, further training with the first training data PIC(CL) can only be expected to provide a slight improvement. Conversely, a larger distribution width of the learning parameters LP can be taken as an indication that an optimum has not yet been found and that classification accuracy can be improved by further training using training data of the same type, here PIC(CL).

A classification uncertainty that can be reduced by further training with more training data of the same type is often referred to as epistemic uncertainty.

By means of the neural network BNN, a value distribution VOCL of the output data OCL of the neural network BNN is also determined. In determining the value distribution VOCL, it is advantageously assumed that the output data OCL are distributed over the recognition classes according to a possibly multidimensional statistical Gaussian distribution or a categorical distribution, and that the distributions of individual output data are independent of one another. The value distribution VOCL is then represented by a distribution width, in this case a variance or standard deviation of the Gaussian distribution or the categorical distribution. Alternatively or in addition to the distribution width, an entropy value of the value distribution VOCL can also be determined.

It turns out that a larger distribution width of the output data OCL can be taken as an indication that the trained neural network BNN can only perform an uncertain classification. If at the same time the value distribution VLP of the learning parameters LP is relatively small—which suggests an almost exhaustively trained neural network BNN—it is highly unlikely that a classification quality will be significantly improved by further training with training data of the same type, here PIC(CL). In such cases, however, the classification quality can often be significantly improved by continuing the training with different training data, in this case PIC2(CL).

Such a classification uncertainty that does not substantially improve by continued training with training data of the same type is often referred to as aleatoric uncertainty. An aleatoric uncertainty occurs, for example, in an attempted prediction of a random coin toss or in an attempted classification based on sensor data that is irrelevant or uncorrelated with the classification. Such a classification cannot be improved by increasing the amount of (irrelevant) training data.

The value distributions VLP and VOCL are transferred from the neural network BNN to an evaluation module EVAL of the evaluation device AW. The evaluation module EVAL is linked to the neural network BNN and used to evaluate the progress of a training run. The evaluation module EVAL uses the value distribution VOCL of the output data OCL and the value distribution VLP of the learning parameters LP to quantify both an aleatoric uncertainty and an epistemic uncertainty. Depending on this, the evaluation module EVAL forms a quantified improvement figure for an expected improvement of the classification by further training with the available first training data, here PIC(CL). The improvement figure can be derived, for example, on the basis of a weighted sum of the distribution widths VLP and VOCL. As mentioned above, the improvement figure is preferably derived in such a way that it falls with decreasing distribution width VLP and increasing distribution width VOCL.

Depending on the improvement figure, a continuation signal CN is also generated and transmitted from the evaluation module EVAL to the selection module SEL. The continuation signal CN can contain, in particular, the value distributions VLP and VOCL and the improvement figure.

Depending on the continuation signal CN received and the improvement figure contained within it, the selection module SEL selects either additional first training data PIC(CL) from the database DB or requests different training data PIC2(CL) from the training data source SRC. A threshold value for the improvement figure can be specified, in such a way that above the threshold value the training is continued with the first training data PIC(CL) and below the threshold the other training data PIC2(CL) is requested and used for further training.

Alternatively or in addition, the continuation signal CN can also be transmitted to the training data source SRC, where, for example, it is used to cause a sensor of a sensor network to acquire training data, to modify a setting of a sensor and/or to select sensor data specifically.

Preferably, the above-described selection of the training data to be used for the subsequent training is carried out on a recognition class-specific basis, i.e., individually for each recognition class CL of the training data. In this case, for a particular recognition class CL, recognition class-specific value distributions VLP and VOCL are determined, a recognition class-specific continuation signal CN is generated and, depending on the recognition class-specific continuation signal CN, the SEL selection module either selects further first training data PIC(CL) of the relevant recognition class CL from the database DB or requests other training data PIC2(CL) of the relevant recognition class CL from the training data source SRC.

The method according to the invention can be used to efficiently control the training of the neural network BNN or the evaluation device AW. Instead of detecting, possibly after a fairly long period of time, that a classification quality for a specific recognition class is not significantly improving, qualitatively different training data can be requested and used for further training at an early stage and on a class-specific basis. As a rule, it is thus possible to avoid supplying further training data that do not significantly improve the classification results, in particular for individual rare recognition classes. As a rule, this can significantly shorten the training period and/or significantly improve the learning outcome.

The invention claimed is:

1. A computer-implemented method for training a machine learning routine for controlling a technical system, comprising:
   inputting a sequence of first training data comprising first sensor data of a technical system for the machine learning routine,
   training the machine learning routine with the first training data, wherein a plurality of learning parameters of the machine learning routine is set by the training,
   determining a value distribution of the learning parameters during the training,
   generating a continuation signal as a function of the determined value distribution of the learning parameters based only on a current determined value distribution of the learning parameters, and
   continuing the training, depending on the continuation signal, with a further sequence of the first training data or with other training data requested for the training.

2. The method as claimed in claim 1, wherein the other training data:
   are of a different type than the first training data,
   are acquired in a different way than the first training data,
   comprise different sensor data than the first sensor data, or
   originate from a different source than the first training data.

3. The method as claimed in claim 1, wherein, depending on the continuation signal, a sensor or a sensor system is controlled such that:
   a sensor parameter of the sensor for acquiring training data is modified,
   the sensor of the sensor system is induced to acquire training data, or
   sensor data of the sensor system are selected as training data.

4. The method as claimed in claim 1, further comprising:
   determining a distribution width or entropy value of the value distribution of the learning parameters, and
   with increasing distribution width or increasing entropy value, continuing the training with the further sequence of the first training data.

5. The method of claim 4 wherein determining a distribution width or entropy value of the value distribution of the learning parameters comprises determining a value distribution of individual learning parameters.

6. The method as claimed in claim 1, further comprising:
   determining a value distribution of output data of the machine learning routine, and
   forming the continuation signal as a function of the value distribution of the output data.

7. The method as claimed in claim 6, further comprising:
   determining a distribution width or entropy value of the value distribution of the output data, and
   with increasing distribution width or increasing entropy value, requesting the other training data.

8. The method as claimed in claim 6, wherein the value distribution of the learning parameters and the value distribution of the output data are each represented by a respective distribution width.

9. The method as claimed in claim 1, further comprising:
   assigning each one of training data records of the first training data to a specific recognition class, and
   for a given recognition class, based on the training data records assigned to this recognition class:
     determining a class-specific value distribution of the learning parameters,
     generating a class-specific continuation signal as a function of the class-specific value distribution of the learning parameters, and
     depending on the class-specific continuation signal, continuing the training with first training data assigned to this recognition class or requesting other training data assigned to this recognition class.

10. The method as claimed in claim 1, wherein the machine learning routine implements an artificial neural network, a recurrent neural network, a convolutional neural network, a Bayesian neural network, an autoencoder, a deep-learning architecture, a support vector machine, a data-driven trainable regression model, a k-nearest-neighbor classifier, a physical model or a decision tree.

11. The method as claimed in claim 1, wherein the value distribution of the learning parameters is determined by the machine learning routine via a Bayesian neural network, wherein the learning parameters are neural weights of the Bayesian neural network.

12. The method as claimed in claim 1, wherein the machine learning routine executes an ensemble of machine sub-learning routines, wherein a set of learning parameters is set, and the value distribution of the learning parameters is derived from a distribution of the learning parameters over the learning parameter sets.

13. The method as claimed in claim 1, wherein:
   the machine learning routine implements a neural network, wherein the learning parameters are neural weights of the neural network, a neural structure of the neural network is varied multiple times and a set of output data of the neural network is determined for a given variation, and the value distribution of the learning parameters is derived from a distribution of the output data over the output data sets.

14. The method of claim 1 further comprising modifying a sensor parameter of a sensor for acquiring training data as a function of the continuation signal.

15. The method of claim 1 further comprising inducing a sensor to acquire sensor data as a function of the continuation signal.

16. The method of claim 1 wherein first training data comprises images of a first resolution and other training data requested for the training comprises images of a second, higher resolution.

17. A device for training a machine learning routine for controlling a technical system, the device comprising one or more processors, application specific integrated circuits (ASIC), digital signal processors (DSP), field programmable gate arrays (FPGA), or any combination thereof and one or more memories, the device configured to:

input a sequence of first training data comprising first sensor data of a technical system for the machine learning routine;

train the machine learning routine with the first training data, wherein a plurality of learning parameters of the machine learning routine is set by the training;

determine a value distribution of the learning parameters during the training;

generate a continuation signal as a function of the determined value distribution of the learning parameters based only on a current determined value distribution of the learning parameters; and continue the training, depending on the continuation signal, with a further sequence of the first training data or with other training data requested for the training.

18. A technical system comprising the device as claimed in claim 17 and further comprising medical diagnostic equipment, image analysis systems, robots, autonomous systems, wind turbines, gas turbines, or production facilities.

19. A non-transitory machine-readable storage medium having a computer program that when executed by a processor causes the processor to:

input a sequence of first training data comprising first sensor data of a technical system for the machine learning routine;

train the machine learning routine with the first training data, wherein a plurality of learning parameters of the machine learning routine is set by the training;

determine a value distribution of the learning parameters during the training;

generate a continuation signal as a function of the determined value distribution of the learning parameters;

continue the training, depending on the continuation signal, with a further sequence of the first training data or with other training data requested for the training;

determine a distribution width or entropy value of the value distribution of the learning parameters comprising determining a value distribution of individual learning parameters, and with increasing distribution width or increasing entropy value, continue the training with the further sequence of the first training data.

20. The non-transitory machine-readable storage medium of claim 19, wherein the computer program when executed by the processor causes the processor to generate the continuation signal based only on a current determined value distribution of the learning parameters.

* * * * *